United States Patent
Weber et al.

(10) Patent No.: US 6,784,233 B1
(45) Date of Patent: Aug. 31, 2004

(54) POLYESTER/POLYCARBONATE BLENDS

(75) Inventors: Martin Weber, Maikammer (DE);
Ingolf Hennig, Neulussheim (DE)

(73) Assignee: BASF Aktiengesellschaft,
Ludwigshafen (DE)

( * ) Notice: Subject to any disclaimer, the term of this patent is extended or adjusted under 35 U.S.C. 154(b) by 150 days.

(21) Appl. No.: 10/018,341

(22) PCT Filed: Jun. 21, 2000

(86) PCT No.: PCT/EP00/05740

§ 371 (c)(1),
(2), (4) Date: Dec. 19, 2001

(87) PCT Pub. No.: WO01/02488

PCT Pub. Date: Jan. 11, 2001

(30) Foreign Application Priority Data

Jul. 1, 1999 (DE) .......................... 199 30 527

(51) Int. Cl.$^7$ ........................................... C08K 5/5317
(52) U.S. Cl. ..................... 524/126; 524/135
(58) Field of Search ................... 524/126, 135

(56) References Cited

U.S. PATENT DOCUMENTS

| | | | |
|---|---|---|---|
| 4,452,932 A | 6/1984 | Brunelle | 524/110 |
| 4,522,797 A | 6/1985 | Pettigrew et al. | 423/300 |
| 4,652,607 A | 3/1987 | Stix | 525/67 |
| 4,764,556 A | 8/1988 | Lausberg et al. | 525/67 |
| 4,791,158 A | 12/1988 | Lausberg | 524/156 |
| 4,897,448 A | 1/1990 | Romance | 525/67 |
| 5,112,913 A | 5/1992 | Horiuchi | 525/133 |
| 5,231,124 A | 7/1993 | Idel | 524/109 |
| 5,453,479 A | 9/1995 | Borman | 528/279 |

FOREIGN PATENT DOCUMENTS

| | | |
|---|---|---|
| DE | 33 02 124 | 7/1984 |
| EP | 114 288 | 8/1984 |
| EP | 180 648 | 5/1986 |
| EP | 256 461 | 2/1988 |
| EP | 373 465 | 6/1990 |
| EP | 634 435 | 1/1995 |
| GB | 1 569 296 | 3/1977 |
| WO | 91/17209 | 11/1991 |

Primary Examiner—Peter Szekely
(74) Attorney, Agent, or Firm—Keil & Weinkauf

(57) ABSTRACT

The invention relates to thermoplastic molding compound that contain A) 1 to 97.85% by weight of at least one thermoplastic polyester, B) 1 to 97.85% by weight of at least one polycarbonate, C) 1 to 50% by weight of a rubber-elastic polymer, D) 0.1 to 5% by weight of a phosphorous stabilizer, E) 0.05 to 2% by weight of an organic acid, F) 0 to 60% by weight of further additives. The weight percentages of the components A) to F) add up to 100%.

4 Claims, No Drawings

POLYESTER/POLYCARBONATE BLENDS

The invention relates to thermoplastic molding compositions comprising
- A) from 1 to 97.85% by weight of at least one thermoplastic polyester,
- B) from 1 to 97.85% by weight of at least one polycarbonate,
- C) from 1 to 50% by weight of an elastomeric polymer,
- D) from 0.1 to 5% by weight of a phosphorus-containing stabilizer,
- E) from 0.05 to 2% by weight of an organic acid, and
- F) from 0 to 60% by weight of other additives, where the percentages by weight of components A) to F) give 100%.

The invention further relates to the use of the novel molding compositions for producing fibers, films or moldings, and also to the resultant moldings of any type.

Industry is increasingly interested in polymer mixtures, since they provide tailored combinations of properties. Of particular interest here are polymer mixtures made from incompatible polymers which have unusual combinations of properties.

Polymer mixtures based on polyesters and polycarbonates are known (U.S. Pat. Nos. 4,522,797, 4,764,556, 4,897,448, EP-A 180 648, DE-A 3302124). Industrially significant products also have impact modifiers present to improve toughness, in particular at low temperatures, and preferred modifiers here are MBS modifier, acrylate graft rubbers and also ethylene copolymers with polar comonomers.

J. Devaux, P. Godard, J. P. Mercier, Polym. Eng. Sci., 22, 229 (1982) has disclosed that catalyst residues present in the polyester cause transesterification during melt compounding with polycarbonate. This gives copolymers, which improve the mechanical properties of the resultant blends. However, at high processing temperatures the transesterification is so rapid that there is substantial impairment of the mechanical and thermal properties of the resultant moldings. In addition, molding compositions prepared at high processing temperatures have poor surface quality (streaks and discoloration).

A wide variety of experiments has also been undertaken to improve the processing stability of polyester/polycarbonate blends. For example, EP-A 114 288 describes polyester/polycarbonate blends in which the MBS rubber added is premixed with a stabilizer in a prior step. This measure improves the mechanical properties of the molding compositions. However, the stability of the molding compositions at relatively high processing temperatures is unsatisfactory.

EP-A 634 435 describes a catalyst mixture composed of a Ti compound and a phosphorus compound which can be used to prepare polyesters. Polyesters prepared in this way have a slightly reduced tendency to transesterify in blends with polycarbonate.

U.S. Pat. No. 4,452,932 proposes, for example, ortho-substituted aromatic hydroxyl compounds to protect polycarbonate/polybutylene terephthalate blends from transesterification.

DE-A 19900891 proposes a process for premixing phosphonites with polyesters to improve processing stability.

EP-A 256 461 describes molding compositions based on polycarbonate and polyesters, which comprise small amounts of sulfonic acids. Although the products have improved toughness, processing stability is inadequate.

In particular when large-surface-area parts are produced, the long flow paths continue to cause processing problems since the blends known hitherto do not have sufficient stabilization.

It is an object of the present invention to provide polyester-polycarbonate blends which have improved processing stability and mechanical properties. In particular, heat resistance and melt stability for long cycle times should be improved.

We have found that this object is achieved by means of the thermoplastic molding compositions defined at the outset. Preferred embodiments are given in the subclaims.

The novel molding compositions comprise, as component (A), from 5 to 97.85% by weight, preferably from 10 to 92.7% and in particular from 12.5 to 89.85% by weight, of a thermoplastic polyester.

Use is generally made of polyesters A) based on aromatic dicarboxylic acids and on an aliphatic or aromatic dihydroxy compound.

A first group of preferred polyesters is that of polyalkylene terephthalates whose alcohol moiety has from 2 to 10 carbon atoms.

Polyalkylene terephthalates of this type are known per se and are described in the literature. Their main chain contains an aromatic ring which derives from the aromatic dicarboxylic acid. There may also be substitution of the aromatic ring, e.g. by halogen, such as chlorine or bromine, or by $C_1$–$C_4$-alkyl, such as methyl, ethyl, iso- or n-propyl, or n-, iso- or tert-butyl.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol.

The viscosity number of the polyesters (A) is generally in the range from 50 to 220, preferably from 80 to 160 (measured in a 0.5% strength by weight solution in a phenol/o-dichlorobenzene mixture in a weight ratio of 1:1 at 25° C. in accordance with ISO 1628.

Particular preference is given to polyesters whose carboxyl end group content is up to 100 mval/kg of polyester, preferably up to 50 mval/kg of polyester and in particular up to 40 mval/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyesters which are different from PBT, for example polyethylene terephthalate (PET). The proportion e.g. of the polyethylene terephthalate in the mixture is preferably up to 50% by weight, in particular from 10 to 30% by weight, based on 100% by weight of A).

It is also advantageous to use recycled PET materials (also termed scrap PET), if desired in a mixture with polyalkylene terephthalates, such as PBT.

Recycled materials are generally:
1) those known as post-industrial recycled materials: these are production wastes during polycondensation or during processing, e.g. sprues from injection molding, start-up material from injection molding or extrusion, or edge trims from extruded sheets or films.
2) post-consumer recycled materials: these are plastic items which are collected and treated after utilization by the end consumer. Blow-molded PET bottles for mineral water, soft drinks and juices are easily the predominant items in terms of quantity.

Both types of recycled material may be used either as ground material or in the form of pellets. In the latter case, the crude recycled materials are isolated and purified and then melted and pelletized using an extruder. This usually facilitates handling and free flow, and metering for further steps in processing.

The recycled materials used may either be pelletized or in the form of regrind. The edge length should not be more than 6 mm, preferably less than 5 mm.

Because polyesters undergo hydrolytic cleavage during processing (due to traces of moisture) it is advisable to predry the recycled material. The residual moisture after drying is preferably from 0.01 to 0.7%, in particular from 0.2 to 0.6%.

Another group to be mentioned is that of fully aromatic polyesters deriving from aromatic dicarboxylic acids and aromatic dihydroxy compounds.

Suitable aromatic dicarboxylic acids are the compounds previously mentioned for the polyalkylene terephthalates. The mixtures preferably used are made from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the formula

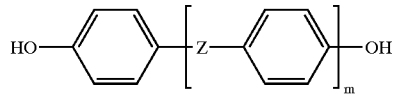

where Z is alkylene or cycloalkylene having up to 8 carbon atoms, arylene having up to 12 carbon atoms, carbonyl, sulfonyl, oxygen or sulfur, or a chemical bond, and m is from 0 to 2. The phenylene groups of the compounds may also have substitution by $C_1$–$C_6$-alkyl or alkoxy and fluorine, chloride or bromine.

Examples of parent substances for these compounds are dihydroxydiphenyl,
di(hydroxyphenyl)alkane,
di(hydroxyphenyl)cycloalkane,
di(hydroxyphenyl)sulfide,
di(hydroxyphenyl)ether,
di(hydroxyphenyl)ketone,
di(hydroxyphenyl)sulfoxide,
α,α'-di(hydroxyphenyl)dialkylbenzene,
di(hydroxyphenyl)sulfone, di(hydroxybenzoyl)benzene resorcinol and
hydroquinone and also the ring-alkylated and ring-halogenated derivatives of these.

Among these, preference is given to
4,4'-dihydroxydiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4,'-dihydroxybenzophenone,
4,4,'-dihydroxydiphenylsulfone and
2,2-di(3',5'-dimethyl-4'-hydroxyphenyl)propane
or mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

According to the invention, the molding compositions comprise, as component B), amounts of from 1 to 97.85% by weight, preferably from 5 to 87.7% by weight and in particular from 7.5 to 84.15% by weight, of at least one polycarbonate.

Halogen-free polycarbonates are preferably used as component B). Examples of suitable halogen-free polycarbonates are those based on biphenols of the formula

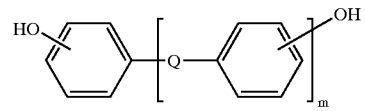

where Q is a single bond, $C_1$–$C_8$-alkylene, $C_2$–$C_3$-alkylidene, $C_3$–$C_6$-cycloalkylidene, $C_6$–$C_{12}$-arylene, or also —O—, —S— or —SO$_2$—, and m is an integer from 0 to 2.

The phenylene radicals of the biphenols may also have substituents, such as $C_1$–$C_6$-alkyl or $C_1$–$C_6$-alkoxy.

Examples of preferred biphenols of this formula are hydroquinone, resorcinol, 4,4'-dihydroxybiphenyl, 2,2-bis (4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl) propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component B, and preference is given to the copolycarbonates of bisphenol A, as well as to bisphenol A homopolymer.

Suitable polycarbonates may be branched in a known manner, specifically and preferably by incorporating from 0.05 to 2.0 mol %, based on the total of the biphenols used, of at least trifunctional compounds, for example those having three or more phenolic OH groups.

Polycarbonates which have proven particularly suitable have relative viscosities nrel of from 1.10 to 1.50, in particular from 1.25 to 1.40. This corresponds to an average molar mass $M_W$ (weight-average) of from 10,000 to 200,000 g/mol, preferably from 20,000 to 80,000 g/mol.

The biphenols of this formula are known per se or can be prepared by known processes.

The polycarbonates may, for example, be prepared by reacting the biphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782).

Examples of suitable chain terminators are phenol, p-tert-butylphenol, or else long-chain alkylphenols, such as 4-(1, 3-tetramethylbutyl)phenol as in DE-A 28 42 005, or monoalkylphenols, or dialkylphenols with a total of from 8 to 20 carbon atoms in the alkyl substituents as in DE-A 35 06 472, such as p-nonylphenyl, 3,5-di-tert-butylphenol, p-tert-octylphenol, p-dodecylphenol, 2-(3,5-dimethylheptyl) phenol and 4-(3,5-dimethylheptyl)phenol.

For the purposes of the present invention, halogen-free polycarbonates are polycarbonates made from halogen-free biphenols, from halogen-free chain terminators and, if desired, from halogen-free branching agents, where the content of subordinate amounts at the ppm level of hydrolyzable chlorine, resulting, for example, from the preparation of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components B) which may be mentioned are amorphous polyester carbonates, where phosgene has been replaced by aromatic dicarboxylic acid units, such as isophthalic acid and/or terephthalic acid units, during the preparation. For further details reference may be made at this point to EP-A 711,810.

EP-A 365 916 describes other suitable copolycarbonates having cycloalkyl monomer units.

It is also possible to replace bisphenol A with bisphenol TMC Polycarbonates of this type are commercially available from Bayer with the trade mark APEC HT®.

The novel molding compositions comprise, as component C), from 1 to 50% by weight, preferably from 2 to 30% by weight and in particular from 3 to 25% by weight, of an elastomeric polymer (also frequently termed an impact modifier, elastomer or rubber).

These are very generally copolymers which have preferably been built up from at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type have been described, for example, in Houben-Weyl, Methoden der organischen Chemie, Vol. 14/1 (Georg-Thieme-Verlag, Stuttgart, 1961), pages 392–406, and in the monograph by C. B. Bucknall, "Toughened Plastics" (Applied Science Publishers, London, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, or mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Polyolefin copolymers obtainable by polymerizing in the presence of a metallocene catalyst are also suitable.

Particularly preferred elastomers C) are polyethyleneoctene and polyethylenebutene copolymers with a proportion of up to 50% by weight, preferably up to 45% by weight, of octene and/or butene. Copolymers of ethylene with acrylic acid and/or methacrylic acid and/or with the esters of these acids are another group of preferred rubbers. The rubbers may also include dicarboxylic acids, such as maleic acid and fumaric acid, or derivatives of these acids, e.g. esters and anhydrides, and/or monomers containing epoxy groups. These monomers containing dicarboxylic acid derivatives or containing epoxy groups are preferably incorporated into the rubber by adding to the monomer mixture monomers containing dicarboxylic acid groups and/or epoxy groups and having the formula I, II, III or IV

(I)

R$^1$C(COOR$^2$)=C(COOR$^3$)R$^4$

(II)

(III)

CHR$^7$=CH—(CH$_2$)$_m$—O—(CHR$^6$)$_g$—CH—CHR$^5$

(IV)

CH$_2$=CR$^9$—COO—(CH$_2$)$_p$—CH—CHR$^8$ where R$^1$ to R$^9$ are hydrogen or alkyl having from 1 to 6 carbon atoms, and m is an integer from 0 to 20, g is an integer from 0 to 10 and p is an integer from 0 to 5.

R$^1$ to R$^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates containing epoxy groups, such as glycidyl acrylate and glycidyl methacrylate, and the esters with tertiary alcohols, such as tert-butyl acrylate. Although the latter have no free carboxyl groups their behavior approximates to that of the free acids and they are therefore termed monomers with latent carboxyl groups.

The copolymers are advantageously composed of from 50 to 98% by weight of ethylene, from 0.1 to 20% by weight of monomers containing epoxy groups and/or methacrylic acid and/or monomers containing anhydride groups, the remaining amount being (meth)acrylates.

Particular preference is given to copolymers composed of
from 50 to 98% by weight, in particular from 55 to 95% by
  weight, of ethylene,
from 0.1 to 40% by weight, in particular from 0.3 to 20% by
  weight, of glycidyl acrylate and/or glycidyl methacrylate,
  (meth)acrylic acid and/or maleic anhydride, and
from 1 to 45% by weight, in particular from 10 to 40% by
  weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well known.

Preferred elastomers also include emulsion polymers whose preparation is described, for example, by Blackley in the monograph "Emulsion Polymerization". The emulsifiers and catalysts which may be used are known per se.

In principle it is possible to use homogeneously structured elastomers or those with a shell structure. The shell-like structure is a function of the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, and corresponding methacrylates, and butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature below 0° C.) of the elastomers may be the core, the outer envelope or an intermediate shell (in the case of elastomers whose structure has more than two shells). Elastomers having more than one shell may also have more than one shell made from a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxyl, latent carboxyl, amino and amide groups, and also functional groups which may be introduced by concomitant use of monomers of the formula

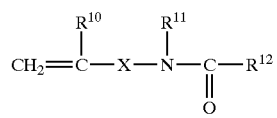

where:
$R^{10}$ is hydrogen or $C_1$–$C_4$-alkyl,
$R^{11}$ is hydrogen or $C_1$–$C_8$-alkyl or aryl, in particular phenyl,
$R^{12}$ is hydrogen, $C_1$–$C_{10}$-alkyl, $C_6$–$C_{12}$-aryl or —$OR^{13}$,
$R^{13}$ is $C_1$–$C_8$-alkyl or $C_6$–$C_{12}$-aryl, if desired with substitution by O- or N-containing groups, X is a chemical bond or $C_1$–$C_{10}$-alkylene or $C_6$–$C_{12}$-arylene, or

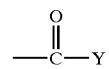

Y is O—Z or NH—Z, and
Z is $C_1$–$C_{10}$-alkylene or $C_6$–$C_{12}$-arylene.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers containing allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention is made firstly of graft polymers with a core and at least one outer shell and the following structure:

| Type | Monomers for the core | Monomers for the envelope |
|---|---|---|
| I | 1,3-butadiene, isoprene, n-butyl acrylate, ethylhexyl acrylate or mixtures of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |

-continued

| Type | Monomers for the core | Monomers for the envelope |
|---|---|---|
| IV | as I or II | as I or III, but with concomitant use of monomers with reactive groups as described herein |
| V | styrene, acrylonitrile, methyl methacrylate or mixtures of these | first envelope made of monomers as described in I and II for the core second envelope as described in I or IV for the envelope |

Instead of graft polymers whose structure has more than one shell it is also possible to use homogeneous, i.e. single-shell, elastomers made from 1,3-butadiene, isoprene and n-butyl acrylate or from copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer envelope made from the abovementioned copolymers, and copolymers of ethylene with comonomers which supply reactive groups.

The elastomers described may also be prepared by other conventional processes, e.g. by suspension polymerization.

Preference is likewise given to silicone rubbers, as described in DE-A 37 25 576, EP-A 235 690, DE-A 38 00 603 and EP-A 319 290.

It is, of course, also possible to use mixtures of the types of rubber listed above.

Suitable phosphorus-containing stabilizers D) are preferably organic phosphonites of the formula I

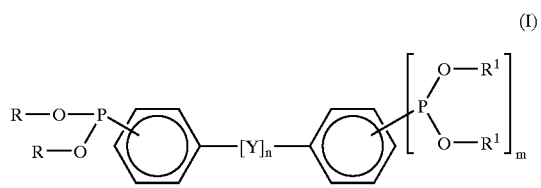

(I)

where
m is 0 or 1,
n is 0 or 1,
Y is an oxygen bridge, a sulfur bridge or a 1,4-phenylene bridge, or a bridging unit of the formula —CH($R^2$)—; each of the R—O— and $R^1$—O-groups, independently of one another, is the radical of an aliphatic, alicyclic or aromatic alcohol which may contain up to three hydroxyl groups, but excluding any arrangement of the hydroxyl groups which permits these to be part of a phosphorus-containing ring (termed monovalent R—O-groups), or two R—O— or, respectively, $R^1$—O-groups, bonded to a phosphorus atom, in each case independently of one another, together are the radical of an aliphatic, alicyclic or aromatic alcohol having a total of up to three hydroxyl groups (termed bivalent R—O—, or, respectively, $R^1$—O-groups),
$R^2$ is hydrogen, $C_1$–$C_8$-alkyl or a group of the formula $COOR^3$, and
$R^3$ is $C_{1-8}$-alkyl.

It is preferable for at least one R—O— and at least one $R^1$—O group to be a phenol radical which carries a sterically hindered group, in particular t-butyl, in the 2 position.

Particular preference is given to tetrakis(2,4-di-tert-butylphenyl)biphenylenediphosphonite, which is available commercially from Ciba Geigy AG as Irgaphos® PEPQ.

If R—O— and $R^1$—O— are bivalent radicals, they preferably derive from di- or trihydric alcohols R is preferably the same as $R^1$ and is alkyl, aralkyl (preferably unsubstituted or substituted phenyl or phenylene), aryl (preferably unsubstituted or substituted phenyl) or a group of the formula α

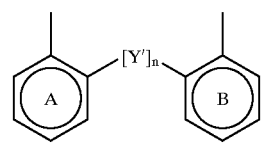

(α)

where the rings A and B may carry other substituents and Y' is an oxygen bridge or a sulfur bridge or a bridging unit of the formula —CH($R^3$)—,
$R^2$ is hydrogen, $C_1$–$C_8$-alkyl or a group of the formula —$COOR^3$, and
$R^3$ is $C_{1-8}$-alkyl, and
n is 0 or 1 (termed bivalent R').

Particularly preferred radicals R are radicals R", where this is $C_{1-22}$-alkyl, phenyl, which may carry from 1 to 3 substituents selected from the group consisting of cyano, $C_{1-22}$-alkyl, $C_{1-22}$-alkoxy, benzyl, phenyl, 2,2,6,6-tetramethylpiperidyl-4-, hydroxyl, $C_{1-8}$-alkylphenyl, carboxyl, —$C(CH_3)_2$—$C_6H_5$, —COO—$C_{1-22}$-alkyl, $CH_2CH_2$—COOH, —$CH_2CH_2COO$—, $C_{1-22}$-alkyl or —$CH_2$—S—$C_{1-22}$-alkyl; or a group of the formulae i to vii

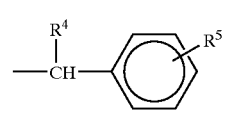

(i)

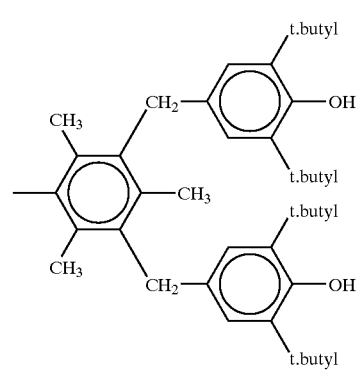

(ii)

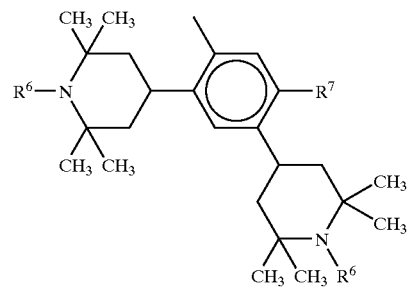

(iii)

-continued

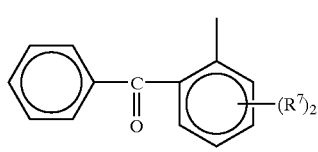
(iv)

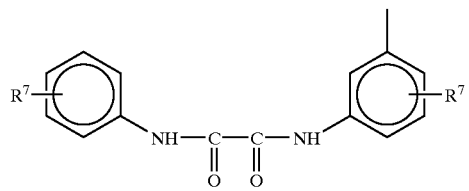
(v)

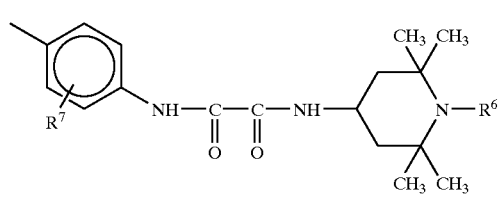
(vi)

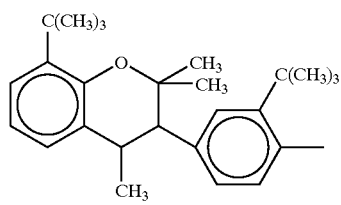
(vii)

or two R" together are a group of the formula viii

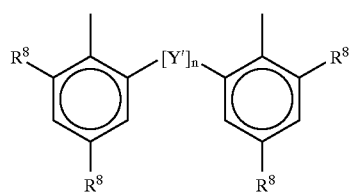
(viii)

where
$R^8$ is hydrogen or $C_{1-22}$-alkyl,
$R^6$ is hydrogen, $C_{1-4}$-alkyl or, —CO—$C_{1-8}$-alkyl,
$R^4$ is hydrogen or $C_{1-22}$-alkyl,
$R^5$ is hydrogen, $C_{1-22}$-alkyl, $C_{1-22}$-alkoxy, benzyl, cyano, phenyl, hydroxyl, $C_{1-8}$-alkylphenyl, $C_{1-22}$-alkoxycarbonyl, $C_{1-22}$-alkoxycarbonylethyl, carboxyethyl, 2,2,6,6-tetramethylpiperidyl-4- or a group of the formula —CH$_2$—S—C$_{1-22}$-alkyl or —C(CH$_3$)$_2$—C$_6$H$_5$, and
$R^7$ is hydrogen, $C_{1-22}$-alkyl, hydroxy or alkoxy, and
Y' and n are as defined above.

Particularly preferred radicals R are radicals R" which have one of the formulae a to g

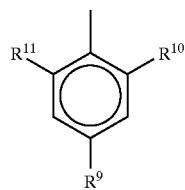
(a)

-continued

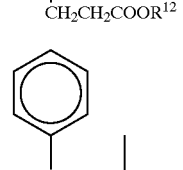
(b)

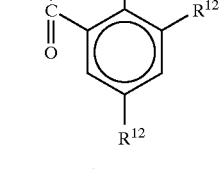
(c)

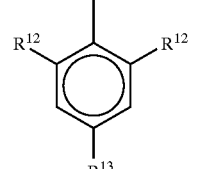
(d)

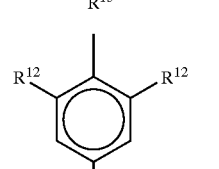
(e)

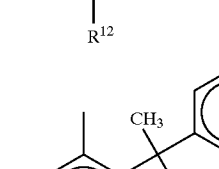
(f)

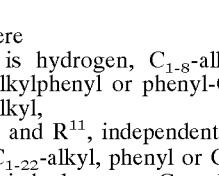
(g)

where
$R^9$ is hydrogen, $C_{1-8}$-alkyl, $C_{1-8}$-alkoxy, phenyl, $C_{1-8}$-alkylphenyl or phenyl-$C_{1-8}$-alkylphenyl or phenyl-$C_{1-4}$-alkyl,
$R^{10}$ and $R^{11}$, independently of one another, are hydrogen, $C_{1-22}$-alkyl, phenyl or $C_{1-8}$-alkylphenyl,
$R^{12}$ is hydrogen or $C_{1-8}$-alkyl, and
$R^{13}$ is cyano, carboxyl or $C_{1-8}$-alkoxycarbonyl.

Preferred groups of the formula a are 2-tert-butylphenyl, 2-phenylphenyl, 2-(1',1'-dimethylpropyl)phenyl, 2-cyclohexylphenyl, 2-tert-butyl-4-methylphenyl, 2,4-di-tert-amylphenyl, 2,4-di-tert-butylphenyl, 2,4-diphenylphenyl, 2,4-di-tert-octylphenyl, 2-tert-butyl-4-phenylphenyl, 2,4-bis(1',1'-dimethylpropyl)phenyl, 2-(1'-phenyl-1'-methylethyl)phenyl, 2,4-bis(1'-phenyl-1'-methylethyl)phenyl and 2,4-di-tert-butyl-6-methylphenyl.

Suitable inorganic transesterification stabilizers are described, for example, in U.S. Pat. No. 5,674,928. Particularly suitable compounds which may be mentioned are acid salts of phosphoric acid, e.g. monozinc phosphate, calcium dihydrogen phosphate, sodium dihydrogen phosphate and potassium dihydrogen phosphate. It is also possible to use phosphates, e.g. zinc phosphate or copper phosphate. Other metal phosphates with metals of the first or second transition group are also suitable. Use may also be made of P-containing acids, e.g. phosphoric acid. Examples of suitable compounds are $Na_3HP_2O_7$, $K_2H_2P_2O_7$, $KaH_2P_2O_7$ and $Na_2H_2P_2O_7$.

The amount of the stabilizers D) present in the novel molding compositions is from 0.1 to 5% by weight, preferably from 0.2 to 2.5% by weight and in particular from 0.25 to 2% by weight.

According to the invention the molding compositions comprise, as component E), an organic acid or a mixture of two or more different organic acids, in particular low-molecular-weight halogen-free acids. The proportion of this component in the molding compositions is generally from 0.05 to 2% by weight, preferably from 0.1 to 1.8% by weight, in particular from 0.1 to 1.5% by weight, based on the total weight of the molding compositions.

For the purposes of the present invention, low-molecular-weight compounds may have up to a multiplicity of rings, for example up to 5 rings, and are in particular monomolecular compounds, and, of course, acids include the associated moieties typical of acids. Acid hydrates are also included.

According to the invention the acids are halogen-free, i.e. their molecular structure contains no halogens. However, acids which have small amounts of halogen-containing impurities are included according to the invention.

Use is advantageously made of acids which have little or no volatility at the processing temperatures and, respectively, do not decompose at up to about 300° C.

The acids may contain one, two or more acid groups, for example up to ten acid groups.

Preference is given to the use of organic acids, which may be aromatic or else aliphatic. It is also possible to use aliphatic-aromatic acids. Preferred acids include palmitic acid, stearic acid, benzoic acid, isophthalic acid, terephthalic acid, trimellitic acid, sulfonic acids, such as p-toluenesulfonic acid, fumaric acid, citric acid, mandelic acid and tartaric acid.

Particular preference is given to the use of citric acid or p-toluenesulfonic acid or mixtures of these. The proportion of citric acid in these by weight may, for example, be from 1 to 99%, preferably from 10 to 90% and that of p-toluenesulfonic acid correspondingly from 1 to 99%, preferably from 10 to 90%.

Besides the essential components A), B), C), D) and E) amounts of up to 60% by weight, preferably up to 50% by weight, of other additives F) may be added to the molding compositions.

Fibrous or particulate fillers which may be mentioned are carbon fibers, glass fibers, glass beads, amorphous silica, asbestos, calcium silicate, calcium metasilicate, magnesium carbonate, kaolin, chalk, powdered quartz, mica, barium sulfate and feldspar, used in amounts of up to 50% by weight, in particular up to 40% by weight.

Preferred fibrous fillers which may be mentioned are carbon fibers, aramid fibers and potassium titanate fibers, and particular preference is given to glass fibers in the form of E glass. These may be used as rovings or chopped glass in the commercially available forms.

The fibrous fillers may have been surface-pretreated with a silane compound to improve compatibility with the thermoplastic.

Suitable silane compounds have the formula

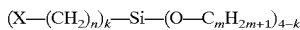

where:

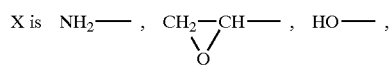

n is an integer from 2 to 10, preferably 3 or 4
m is an integer from 1 to 5, preferably 1 or 2, and
k is an integer from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which contain a glycidyl group as substituent X.

The amounts of the silane compounds generally used for surface-coating are from 0.05 to 5% by weight, preferably from 0.5 to 1.5% by weight and in particular from 0.8 to 1% by weight (based on F).

Acicular mineral fillers are also suitable.

For the purposes of the invention, acicular mineral fillers are mineral fillers with strongly developed acicular character. An example which may be mentioned is acicular wollastonite. The mineral preferably has an L/D (length to diameter) ratio of from 3:1 to 35:1, preferably from 8:1 to 11:1. The mineral filler may, if desired, have been pretreated with the abovementioned silane compounds, but the pretreatment is not essential.

Other fillers which may be mentioned are kaolin, calcined kaolin, wollastonite, talc and chalk.

The novel thermoplastic molding compositions may comprise, as component F), conventional processing aids, such as stabilizers, oxidation retarders, agents to counter thermal decomposition and decomposition by ultraviolet light, lubricants, mold-release agents, colorants, such as dyes and pigments, nucleating agents, plasticizers, etc.

Examples of oxidation retarders and heat stabilizers are sterically hindered phenols and/or phosphites, hydroquinones, aromatic secondary amines, such as diphenylamines, various substituted representatives of these groups and mixtures of these in concentrations of up to 1% by weight, based on the weight of the thermoplastic molding compositions. These differ from B).

UV stabilizers which should be mentioned and are usually used in amounts of up to 2% by weight, based on the molding composition, are various substituted resorcinols, salicylates, benzotriazoles and benzophenones.

Colorants which may be added are inorganic pigments, such as titanium dioxide, ultramarine blue, iron oxide and carbon black, and also organic pigments, such as phthalocyanines, quinacridones and perylenes, and also dyes, such as nigrosine and anthraquinones.

Nucleating agents which may be used are sodium phenylphosphinate, aluminum oxide, silicon dioxide and also preferably talc.

The amounts of lubricants and mold-release agents used are usually up to 1% by weight. These are preferably long-chain fatty acids (e.g. stearic acid or behenic acid), salts of these (e.g. Ca stearate or Zn stearate) or montan waxes (mixtures of straight-chain saturated carboxylic acids with chain lengths of from 28 to 32 carbon atoms), or also low-molecular-weight polyethylene waxes or low-molecular-weight polypropylene waxes.

Examples of plasticizers which should be mentioned are dioctyl phthalates, dibenzyl phthalates, butyl benzyl phthalates, hydrocarbon oils and N-(n-butyl) benzenesulfonamide.

The molding compositions may also comprise from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pp. 484 to 494 and by Wall in "Fluorpolymers" (Wiley Interscience, 1972).

These fluorine-containing ethylene polymers have homogeneous distribution in the molding compositions and preferably have a particle size $d_{50}$ (number average) in the range from 0.05 to 10 µm, in particular from 0.1 to 5 µm. These small particle sizes may particularly preferably be achieved by using aqueous dispersions of fluorine-containing ethylene polymers and incorporating these into a polyester melt.

Other additives which should be mentioned are flame retardants present in the novel molding compositions in amounts of from 0 to 30% by weight, preferably from 0 to 25% by weight. Particularly suitable flame retardants are halogen-containing compounds, such as brominated oligo- or polystyrenes, nitrogen-containig compounds, such as melamine, melamine cyanurate or guanidines, or phosphorus-containing compounds of any type.

The novel thermoplastic molding compositions may be prepared by processes known per se, by mixing the starting components in conventional mixing equipment, such as screw extruders, Brabender mixers or Banbury mixers, and then extruding. The extrudate may be cooled and comminuted. It is also possible to premix individual components and then to add the remaining starting materials to these, individually and/or likewise mixed. Mixing temperatures are generally from 230 to 290° C.

In a preferred method of operation, the components B) to E) and also, if desired, conventional additives F) may be mixed with a polyester prepolymer, compounded and pelletized. The resultant pellets are then condensed to the desired viscosity in the solid phase under an inert gas, continuously or batchwise, at below the melting point of component A).

In another preferred method of operation, components A) and D) are compounded in advance as the masterbatch (concentrate) and then mixed in a usual manner with the other components.

The novel thermoplastic molding compositions have a good combination of mechanical properties, in particular toughness, flowability and melt stability. They are suitable for producing fibers, films or moldings, in particular for applications in the motor vehicle sector and electronics sector, and also as household products or devices in medical engineering.

EXAMPLES

Component A1:

Polybutylene terephthalate with a viscosity number of 130 ml/g and a carboxyl end group content of 34 mval/kg (Ultradur® B 4500 from BASF AG) (VN measured in a 0.5% by weight solution of a 1:1 mixture of phenol and o-dichlorobenzene at 25° C. in accordance with ISO 1628).

Component A2:

Masterbatch made from 80% by weight of polybutylene terephthalate with a viscosity number of 130 ml/g and a carboxyl end group content of 34 mval/kg (Ultradur® B 4500 from BASF AG) (VN measured in a 0.5% strength by weight solution of a 1:1 mixture of phenol and o-dichlorobenzene at 25° C. in accordance with ISO 1628) and 20% by weight of Irgafos® PEPQ (tetrakis(2,4-di-tert-butylphenyl)4,4,'-diphenylenediphosphonite) (component D)

Component B:

Polycarbonate with a VN of 61 ml/g, measured in phenol/dichloromethane (1:1) (based on bisphenol A) (Lexane® 161 from General Electric Plastics).

Component C:

Methyl methacrylate-butadiene-styrene graft rubber with a three-shell structure (polybutadiene core, polystyrene shell, PMMA shell), composed of 15.6% by weight of methyl methacrylate, 16.7% by weight of styrene and 67% by weight of butadiene.

Component D:

Irgafos® PEPQ (tetrakis(2,4-di-tert-butylphenyl)4,4'-diphenylenediphosphonite)

Component E:

Citirc acid hydrate (99% pure)

Preparation and testing of the molding compositions

A twin-screw extruder (barrel temperature 250° C.) was used to mix the components. The melt was passed through a water bath and pelletized. The test specimens were produced at a melt temperature of 260° C. The mechanical properties of the specimens produced by extrusion were also determined.

Heat resistance was determined via the HDT/B. The elongation of the products at break was determined on tensile specimens to ISO 527. The fracture energy of the molding compositions was measured to DIN 53 433 at −30° C.

Processing stability was determined by two methods:
a) In a DSC apparatus the products were first heated from room temperature to 250° C. (1$^{st}$ pass). After rapid cooling, the specimens were then heated at a heating rate of 20 K/min to 250° C. and held at this temperature for 20 minutes. The specimen was then cooled at 10 K/min, whereupon its crystallization behavior was observed. The table gives the full width at half maximum ($T_{1/2}$) of the recrystallization peaks. $T_{1/2}$ decreases as the stability of the material increases.
b) Plaques were produced at 290° C. The fracture energy WS was then determined at −30° C.

The makeups of the molding compositions and the results of the tests are given in Table 1.

TABLE 1

| Example No. | 1C | 2C | 1 | 2 | 3C | 3 | 4 | 4C |
|---|---|---|---|---|---|---|---|---|
| Makeup by component [% by weight] | | | | | | | | |
| A1 | 39 | 35 | 35 | 39 | 59 | 59 | 55 | 60 |
| A2 | — | 5 | 5 | — | — | — | 5 | — |
| B | 50 | 50 | 49.8 | 49.8 | 40 | 39.7 | 39.7 | 39.7 |
| C | 10 | 10 | 10 | 10 | 10 | 10 | 10 | 10 |
| D | 1 | — | — | 1 | 1 | 1 | — | — |
| E | — | — | 0.2 | 0.2 | — | 0.3 | 0.3 | 0.3 |
| HDT B [° C.] | 93 | 95 | 95 | 94 | 76 | 87 | 86 | 73 |
| $\epsilon_r$ [%] | 44 | 78 | 122 | 102 | 34 | 105 | 110 | 107 |
| $W_s$, -30° C. [Nm] | 91 | 95 | 97 | 93 | 76 | 88 | 86 | 83 |
| Processing stability | | | | | | | | |
| $T_{½}$ [° C.] | 32 | 28 | 15 | 18 | 34 | 17 | 17 | 29 |
| $W_s$, -30° C. (290° C.) [Nm] | 53 | 87 | 93 | 88 | 35 | 65 | 66 | 43 |

C: Comparative experiments

What is claimed is:

1. A thermoplastic molding composition comprising

A) from 1 to 97.85% by weight of at least one thermoplastic polyester,

B) from 1 to 97.85% by weight of at least one polycarbonate,

C) from 1 to 50% by weight of an elastomeric polymer,

D) from 0.1 to 5% by weight of a phosphorus-containing stabilizer, wherein component D) is composed of an organic phosphonite of the formula (I):

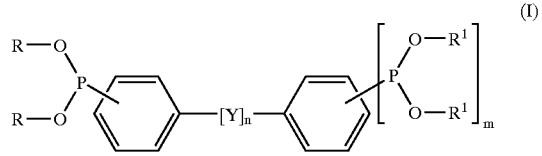

where m is 0 or 1, n is 0 or 1,

Y is an oxygen bridge, a sulfur bridge or a 1,4-phenylene bridge, or a bridging unit of the formula —CH($R^2$)—; each of the R—O— and $R^1$—O- groups, independently of one another, is the radical of an aliphatic, alicyclic or aromatic alcohol which may contain up to three hydroxyl groups, but excluding any arrangement of the hydroxyl groups which permits these to be part of a phosphorus-containing ring (termed monovalent R—O-groups), or two R—O— or, respectively, $R^1$—O-groups, bonded to a phosphorus atom, in each case independently of one another, together are the radical of an aliphatic, alicyclic or aromatic alcohol having a total of up to three hydroxyl groups (termed bivalent R—O—, or, respectively, $R^1$—O-groups), $R^2$ is hydrogen, $C_1$–$C_8$-alkyl or a group of the formula $COOR^3$, and $R^3$ is $C_{1-8}$-alkyl or is composed of at least one inorganic salt of phosphoric acids, E) from 0.05 to 2% by weight of an organic acid, and F) from 0 to 60% by weight of other additives, where the percentages by weight of components A) to F) give 100%.

2. A thermoplastic molding composition as claimed in claim 1, wherein component A) is composed of a polyalkylene terephthalate having from 2 to 10 carbon atoms in the alcohol moiety.

3. A thermoplastic molding composition as claimed in claim 1, wherein component E) is composed of citric acid or of p-toluenesulfonic acid or of mixture of these.

4. A molding of any type, obtainable from the thermoplastic molding compositions as claimed in claim 1.

* * * * *